United States Patent
Brunswig et al.

(10) Patent No.: US 10,095,733 B2
(45) Date of Patent: Oct. 9, 2018

(54) HETEROGENEOUS DATABASE PROCESSING ARCHETYPES FOR HYBRID SYSTEM

(71) Applicants: Frank Brunswig, Heidelberg (DE); Holger Bohle, Dielheim (DE); Markus Cherdron, Muehlhausen (DE); Reiner Hammerich, Rauenberg (DE); Alexander Lingg, Heidelberg (DE); Hans-Juergen Richstein, Rauenberg (DE); Tobias Stein, Heidelberg (DE); Gregor Tielsch, Mannheim (DE); Luc Walterthum, Montigny le Bretonneux (FR)

(72) Inventors: Frank Brunswig, Heidelberg (DE); Holger Bohle, Dielheim (DE); Markus Cherdron, Muehlhausen (DE); Reiner Hammerich, Rauenberg (DE); Alexander Lingg, Heidelberg (DE); Hans-Juergen Richstein, Rauenberg (DE); Tobias Stein, Heidelberg (DE); Gregor Tielsch, Mannheim (DE); Luc Walterthum, Montigny le Bretonneux (FR)

(73) Assignee: SAP SE, Walldorf (DE)

( * ) Notice: Subject to any disclaimer, the term of this patent is extended or adjusted under 35 U.S.C. 154(b) by 243 days.

(21) Appl. No.: 14/508,816

(22) Filed: Oct. 7, 2014

(65) Prior Publication Data
US 2016/0098425 A1    Apr. 7, 2016

(51) Int. Cl.
*G06F 17/30* (2006.01)

(52) U.S. Cl.
CPC .. *G06F 17/30424* (2013.01); *G06F 17/30563* (2013.01); *G06F 17/30498* (2013.01);
(Continued)

(58) Field of Classification Search
CPC ......... G06F 17/30592; G06F 17/30563; G06F 17/30587; G06F 17/30073;
(Continued)

(56) References Cited

U.S. PATENT DOCUMENTS 6,831,668 B2   12/2004  Cras et al.
7,661,113 B2    2/2010  Boeckenhauer et al.
(Continued)

OTHER PUBLICATIONS

Ortiz, "Rethink What's Possible by Connecting Insight to Action," http://events.sap.com/sapphirenow/en/session/4976, Sapphire Now 2014, video length 16:35, provided on electronic media, Jun. 3-5, 2014.
(Continued)

*Primary Examiner* — Dangelino N Gortayo
(74) *Attorney, Agent, or Firm* — Klarquist Sparkman, LLP

(57) ABSTRACT

A database processing system can support applications of an online transaction processing (OLTP) archetype and of an online analytical processing (OLAP) archetype. Hybrid archetypes can also be supported to implement hybrid scenarios. Requests for services are routed to an appropriate engine for fulfillment. User interface assets can be served by a shared infrastructure. Seamless navigation from one archetype to another can be supported in an insight-to-action scenario.

16 Claims, 9 Drawing Sheets

(52) U.S. Cl.
CPC .. *G06F 17/30516* (2013.01); *G06F 17/30545* (2013.01); *G06F 17/30587* (2013.01); *G06F 17/30592* (2013.01)

(58) Field of Classification Search
CPC ......... G06F 17/30091; G06F 17/30315; G06F 17/30371; G06F 17/30377
USPC ........ 707/607, 603, 611, 756, 765, 769, 770
See application file for complete search history.

(56) References Cited

U.S. PATENT DOCUMENTS

| | | | |
|---|---|---|---|
| 7,664,860 B2 | 2/2010 | Beck et al. | |
| 8,056,091 B2 | 11/2011 | Brunswig et al. | |
| 8,074,229 B2 | 12/2011 | Brunswig et al. | |
| 8,170,981 B1* | 5/2012 | Tewksbary | G06F 17/30557 707/600 |
| 8,346,895 B2 | 1/2013 | Cherdron et al. | |
| 8,352,963 B2 | 1/2013 | Boeckenhauer et al. | |
| 8,407,183 B2 | 3/2013 | Foedlesi et al. | |
| 8,713,445 B2 | 4/2014 | Cherdron et al. | |
| 8,751,437 B2 | 6/2014 | Teichmann et al. | |
| 9,329,899 B2* | 5/2016 | Ailamaki | G06F 9/4843 |
| 9,542,445 B2* | 1/2017 | Plattner | G06F 17/30498 |
| 9,652,287 B2* | 5/2017 | van Gulik | G06F 9/4881 |
| 2003/0204534 A1 | 10/2003 | Hopeman et al. | |
| 2007/0136278 A1 | 6/2007 | Grazoli et al. | |
| 2009/0164486 A1 | 6/2009 | Foeldesi et al. | |
| 2009/0240663 A1 | 9/2009 | Plattner et al. | |
| 2011/0161379 A1 | 6/2011 | Grund et al. | |
| 2013/0073513 A1* | 3/2013 | Kemper | G06F 17/30587 707/600 |
| 2013/0110766 A1 | 5/2013 | Promhouse et al. | |
| 2013/0282650 A1* | 10/2013 | Zhang | G06F 17/30592 707/605 |
| 2014/0317048 A1* | 10/2014 | Wang | G06F 17/30377 707/607 |
| 2016/0055222 A1* | 2/2016 | Sarferaz | G06F 17/30587 707/603 |
| 2016/0078085 A1* | 3/2016 | Hu | G06F 17/30563 707/765 |
| 2016/0140205 A1* | 5/2016 | Hsu | G06F 17/30545 707/602 |
| 2017/0032016 A1* | 2/2017 | Zinner | G06Q 10/063 |

OTHER PUBLICATIONS

Plattner et al., "SAP Keynote," http://events.sap.com/sapphirenow/en/session/4804, Sapphire Now, 2013, Orlando, Florida, video length 2:22:40, provided on electronic media, May 13-16, 2013.
Sikka, "SAP Executive Keynote," TechEd, Las Vegas, Nevada, http://www.youtube.com/watch?v=AKLXeCCz2k4, video length 1:51.02, provided on electronic media, Oct. 21-25, 2013.
Said, "SAP Business Suite powered by SAP HANA in General Availability," saphana.com/community, May 16, 2013, 2 pages.

* cited by examiner

HETEROGENEOUS DATABASE PROCESSING ARCHETYPES FOR HYBRID SYSTEM

BACKGROUND

Online analytical processing has become widespread in the computing world. Technologies such as data warehousing have created opportunities for data analytics that were previously difficult or impossible to achieve. In fact, users now expect analytics to work quickly and on a variety of platforms. And now that users have increasing power to analyze their data in a meaningful way, they wish to take immediate action after discovering insights about their data. However, current systems present cumbersome user interfaces and require awkward navigation to achieve such results. Further, conventional data warehousing techniques typically introduce a time lag into the data.

There is therefore room for improvement.

SUMMARY

The Summary is not intended to identify key features or essential features of the claimed subject matter, nor is it intended to be used to limit the scope of the claimed subject matter.

An embodiment can be implemented as a method comprising receiving a request from a client-side shell supporting heterogeneous archetypes of client application programs comprising a transactional application archetype and an analytical application archetype; and based on whether the request is for transactional processing or analytical processing, choosing between directing the request to a transactional engine configured to perform at least one transactional operation on a database, and directing the request to an analytical engine configured to perform at least one analytical operation on a same database.

An embodiment can be implemented as a system comprising one or more computer-readable media comprising a client-executable shell supporting heterogeneous archetypes of client application programs comprising a transactional application archetype and an analytical application archetype; wherein the client-executable shell is configured to direct requests for online transaction processing to a server-side transactional engine supporting online transaction processing on a database; and wherein the client-executable shell is configured to direct requests for online analytical processing to a server-side analytical engine supporting online analytical processing on the same database An embodiment can be implemented as one or more computer readable media comprising computer-executable instructions causing a computing system to perform a method comprising receiving a first request, the first request being for performance of one or more analytical operations; fulfilling the first request by using an analytical engine, the analytical engine performing the one or more analytical operations via a single persistence in a database; sending a first response, the first response comprising one or more results of the one or more analytical operations; receiving a second request, the second request being for performance of a transactional operation, wherein the transactional operation is performed on at least one of the one or more results of the one or more analytical operations; fulfilling the second request by using a transactional engine, the transactional engine performing the transactional operation via a same single persistence in the database; and sending a second response, the second response comprising at least one result of the transactional operation; whereby a single system supports a plurality of different database processing archetypes.

As described herein, a variety of other features and advantages can be incorporated into the technologies as desired.

DETAILED DESCRIPTION

Example 1—Example Overview

The technologies described herein can be used for scenarios involving both online transaction processing and online analytical processing. A single hybrid system can encompass requests for and provide services for both online transaction processing and online analytical processing. Heterogeneous client application archetypes can be supported in a single system via a single shell per client. Transactional requests can be routed to a transactional engine, and analytical requests can be routed to an analytical engine. A search archetype can also be supported. In practice, a large number of clients can be supported.

Seamless navigation in an insight-to-action scenario at the client device can be supported.

User interface assets for presentation at client devices can be provided by an infrastructure shared across database processing archetypes. Numerous other features can be incorporated into the system as described.

The technologies can be helpful to improve user experience and efficiency in scenarios where a user wishes to perform transactional processing on a result presented in an analytical setting. Awkward or impossible navigation between user interfaces can be avoided. Beneficiaries include developers who wish to present a seamless user experience. End users can also benefit from the technologies because they can save time and perform direct processing on results discovered via analytics or search. Because processing for heterogeneous archetypes can be performed on a single database, realtime insight-to-action processing can be achieved.

Example 2—Example System Implementing Heterogeneous Archetypes

Figure 1:
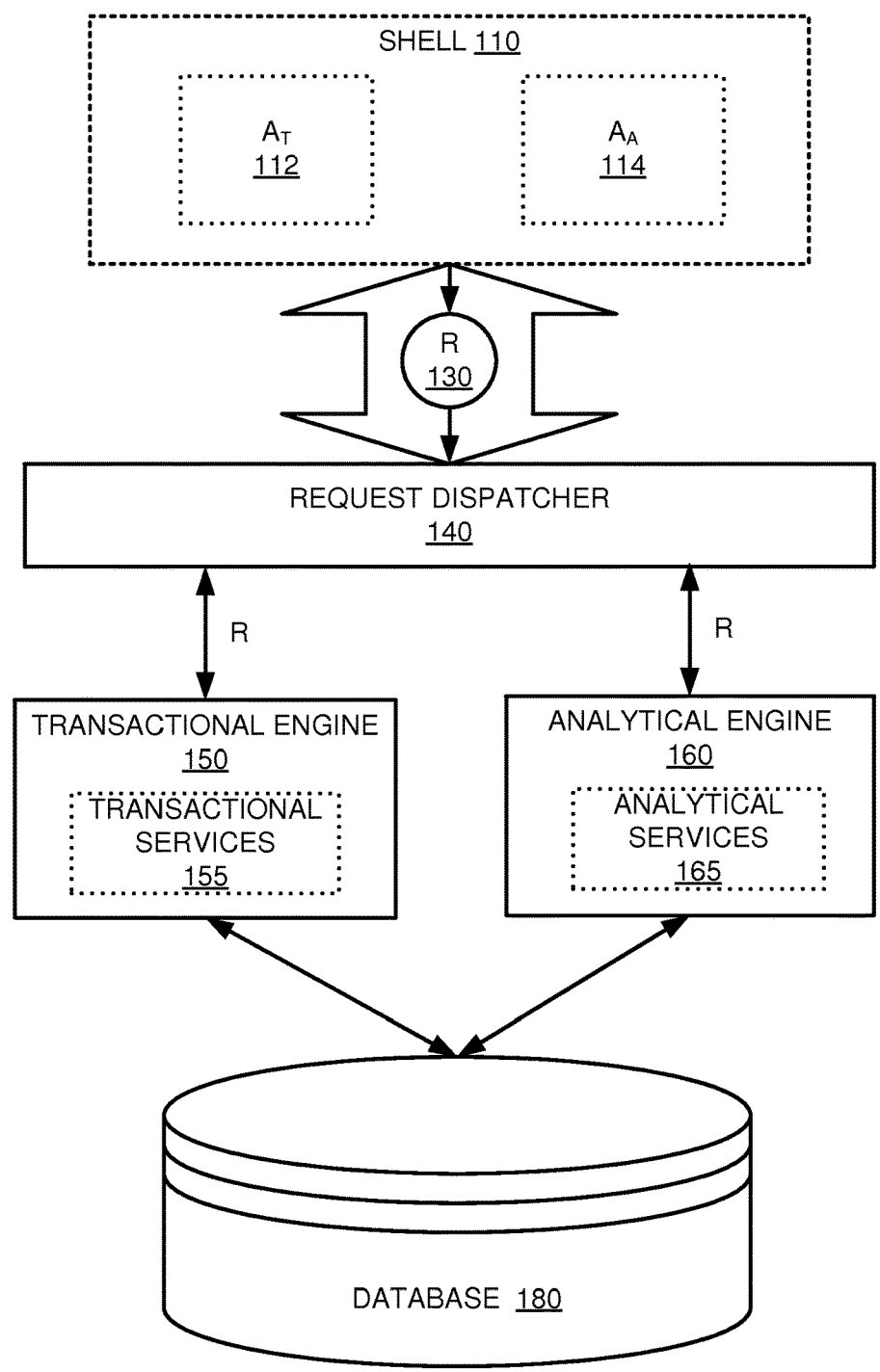
FIG. 1 is a block diagram of an example system implementing heterogeneous client application archetypes.

FIG. 1 is a block diagram of an example system 100 implementing heterogeneous client application archetypes as described herein.

In the example, a client-executable shell 110 supports heterogeneous archetypes of client application programs. Such support can comprise installing, executing, hosting, and the like. The archetypes can comprise an application 112 of a transactional application archetype and an application 114 of an analytical application archetype. In practice, the client-executable shell 110 can host one or more client application programs that conform to the client application archetypes.

Although a given client application program may conform to a single client application archetype, a hybrid client application program of a hybrid archetype can conform to more than one client application archetype and thus take the form of a single, integrated client application serving the roles of two separate client applications.

The client-executable shell 110 is configured to direct requests 130 for online transaction processing to the server-side transactional engine 150 that supports online transaction processing on the database 180 and direct requests for online analytical processing to a server-side analytical engine 160 supporting online analytical processing on the same database 180.

In the example, requests are directed to an intermediary request dispatcher 140. As described herein, the requests 130 can comprise requests for online transaction processing and requests for online analytical processing. The request dispatcher 140 is configured to receive incoming requests 130, to direct requests for online transaction processing to a server-side transactional engine 150, and to direct requests for online analytical processing to a server-side analytical engine 160. As described herein, a variety of mechanisms can be employed for directing requests to the appropriate engine 150, 160, and additional engine types can be supported.

The role of the dispatcher 140 can be assumed by other components of the system 100. For example, the client-executable shell 110 can be configured to direct requests for online transaction processing to the server-side transactional engine 150 and to direct requests for online analytical processing to the server-side analytical engine 160.

The transactional engine 150 supports online transaction processing on a database 180 as described herein by providing transactional services 155. The analytical engine 160 supports online analytical processing on the same database 180 by providing analytical services 165 as described herein. As described herein, such processing can be performed on a single persistence as opposed to maintaining different versions for analytical and transaction processing.

In practice, the systems shown herein, such as system 100, can vary in complexity, with additional functionality, more complex components, and the like. For example, additional components can be included to implement security, redundancy, load balancing, report design, single sign on, and the like. In practice, a large number of different client devices executing versions of the shell 110 can be supported.

The system 100 and any of the other systems described herein can be implemented in conjunction with any of the hardware components described herein, such as the computing systems described below (e.g., processing units, memory, and the like). In any of the examples herein, the inputs, outputs, requests, databases, and engines can be stored in one or more computer-readable storage media or computer-readable storage devices. The technologies described herein can be generic to the specifics of operating systems or hardware and can be applied in any variety of environments to take advantage of the described features.

Example 3—Example Method Implementing Heterogeneous Archetypes

Figure 2:
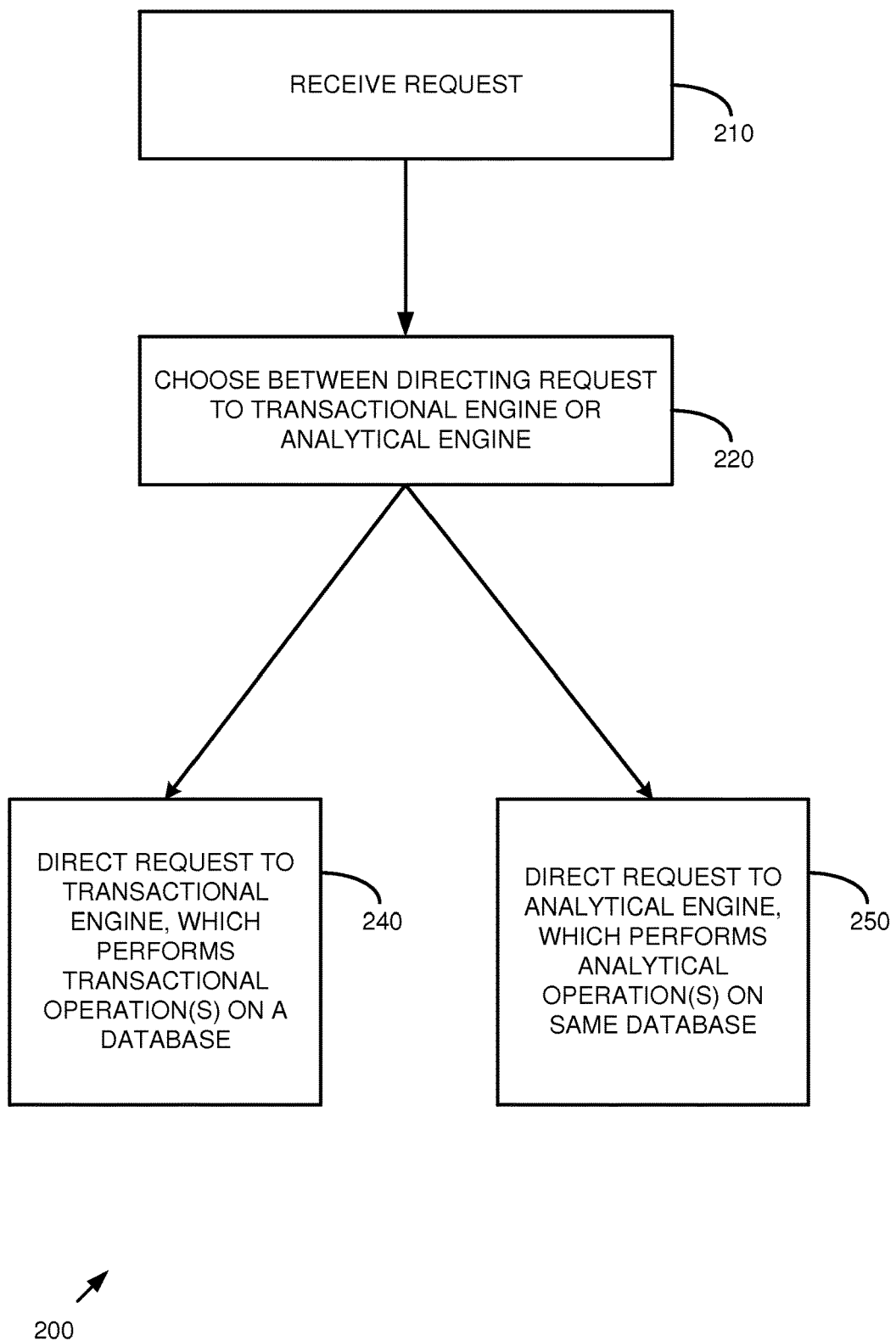
FIG. 2 is a flowchart of an example method of implementing heterogeneous client application archetypes.

FIG. 2 is a flowchart of an example method 200 of implementing heterogeneous client application archetypes and can be implemented, for example, in the system shown in FIG. 1.

At 210, a request for processing is received. Such a request can be any of the requests for processing described herein. The request can be received from a client-side shell supporting heterogeneous archetypes of client application programs comprising a transactional application archetype and an analytical application archetype. As described herein, additional archetypes can be supported. A single application of a hybrid archetype can serve the role of two or more archetypes.

Although the request is described as being "from a client-side shell," the request can originate from within a client-side application program hosted by the client-side shell.

At some point, the database processing type of the request can be determined. (e.g., whether the request is for transactional processing or analytical processing). Other database processing types can be supported as described herein. Such a determination can be explicitly or implicitly determined as described herein.

At 220, based on whether the request is for transactional processing or analytical processing, a choice is made between directing 240 the request to a transactional engine configured to perform at least one transactional operation on a database and directing 250 the request to an analytical engine configured to perform at least one analytical operation on the same database. Such a choice chooses which engine type is to fulfill the request. As described herein, the choice can be implied based on characteristics embedded in the request that cause the request to be directed to an appropriate engine. As described herein, other database processing types (e.g., search and the like) can be supported.

Processing is then performed pursuant to the request to fulfill the request for processing. For example, if the request is routed to a transactional engine, one or more transactional operations are performed on the database based on the contents of the request. If the request is routed to an analytical engine, the analytical engine then performs one or more analytical operations on the database based on the contents of the request.

Although the example shows a request being fulfilled by an analytical engine or a transactional engine, other arrangements are possible. For example, a single request may be for multiple heterogeneous operations, some of which are directed to the transactional engine while others are directed to the analytical engine.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Database Processing Types

In any of the examples herein, a variety of database processing types can be supported. Such processing can be provided as a service to requesting client programs as described herein. Database processing types can include transactional processing, analytical processing, search processing, and the like.

In practice, such processing types correlate with different archetypes as described herein. As a result, requests for database processing of a particular type can be routed to an engine providing services associated with the type.

The system can thus take on a hybrid character because it is composed of a plurality of different processing systems that can work together on a single database but are optimized for database processing of a particular type. The result is an overall more efficient processing of the variety of requests that can be encountered, and particularly responsive performance in an insight-to-action scenario.

Example 5—Example Database Processing Archetypes

In any of the examples herein, a single system can support a plurality of different database processing archetypes (sometimes simply called "archetypes" or "application archetypes" herein) to implement hybrid database processing scenarios. A client application supporting a given database processing archetype is said to be of the application archetype supported. As described, in practice, a single, hybrid client application can support multiple, different database processing archetypes, whereby a single client application serves the role of two or more heterogeneous client applications. An overall system supporting heterogeneous archetypes is also sometimes called a "hybrid system."

For example, a client application of a transactional application archetype can be any client application accessing online transaction processing (OLTP). So, a client application with database functionality for creating, reading, editing, or deleting database records or the like in a transactional setting can be of the transactional application archetype.

Similarly, a client application of an analytical application archetype can be any client application accessing online analytical processing (OLAP). So, a client application with database functionality for adding or removing certain dimensions, drilling down, slicing and dicing, consolidating data via rollups and aggregation, and the like can be of the analytical application archetype.

Other client application archetypes can support access to other database processing services such as online search processing, or the like.

Database processing archetypes can also describe the user interface presented by a client application program, thereby characterizing the client program. For instance, client application programs adhering to the transactional client application archetype can be characterized as "action" programs because they can act to create or change data via online transaction processing. Whereas client application programs adhering to the analytical application archetype can be characterized as "insight" programs because they can provide insight into data via online analytical processing.

A single hybrid application can count as heterogeneous because it implements functionality of plural, different archetypes. Such an application is sometimes described as being of a hybrid archetype.

As described herein, client application programs conforming to client application archetypes can execute on any of a variety of computing systems, including cloud-based arrangements, and the like.

Example 6—Example Database

In any of the examples herein, a database can be implemented to be transaction-safe and support enterprise class database features such as point-in-time recovery, backup and restore, and the like. A database can store data organized as a plurality of records in one or more tables. The database may be a business object store, storing data as a plurality of business objects with one or more attributes.

As described herein, the transactional and analytical operations may be performed on a single persistence stored within the database. Although the database can be implemented as an in-memory, columnar database, the technologies described herein are not limited to such implementations.

In practice, a database can be implemented as part of a larger database management system as described herein.

Example 7—Example Single Persistence

In any of the examples herein, a single persistence can be used for a plurality of database processing types (e.g., both transactional processing and analytical processing). Unlike conventional data warehousing techniques, as soon as a change to a record or business object is saved, it can be reflected for analytical operations, and a second persistence of the data is not needed for analytical processing. Thus, a single persistence in the database can be shared by the different database processing types described herein.

Thus, data replication can be avoided, and analytical processing can be done on the operational data of the system.

Example 8—Example Archetype Overlap

In any of the examples herein, various infrastructure can be shared by different archetypes. For example, data models, roles (e.g., authority objects and policies), and the like can be shared for the back end. In the frontend, UI models for transactions, analytics, and search can be stored in the frontend server also with a corresponding role assignment.

Example 9—Example Transactional Processing

In any of the examples herein, transactional processing can include any functionality characteristic of online transaction processing (OLTP). For example, create, read, update, and delete functionality can be implemented by a transactional engine. Such functionality can be implemented in a transaction-safe manner and support enterprise class database processing.

As described herein a respective database processing engine (e.g., transactional engine) can fulfill requests by providing services (e.g., in the form of responses to requests, modifications to a database, or the like).

In any of the examples herein, OLTP can be used as a tool to modify data stored in data sources (e.g., records stored in database tables, or the like). In practice, online transaction processing involves concurrency controls, atomicity controls, or the like.

Example 10—Example Analytical Processing

In any of the examples herein, analytical processing can include any functionality characteristic of online analytical processing (OLAP). For example, query and other online analytical processing services can be provided by an analytical engine. Such an engine can be implemented by a framework that interprets requests for analytical processing and produces outputs by executing analytical operations.

As described herein a respective database processing engine (e.g., analytical engine) can fulfil requests by providing services (e.g., in the form of responses to requests, modifications to a database, or the like).

In any of the examples herein, OLAP can be used as a tool to explore data sources (e.g., typically database tables combined by joins, unions, or the like). In practice, online analytical processing involves multi-dimensional analytics, dimensional models, star schemas, snowflake schemas, data cubes, pivot tables, or the like.

An online analytical processing operation can be based on an analytical report, which specifies data sources and relationships between such sources for the analytical report. As described herein, an OLAP operation can be executed with reference to a data model to model data from the database.

Upon activation of the analytical report, an online analytical processing session begins. The session can then support navigation within the data (e.g. adding or removing certain dimensions, drilling down, slicing and dicing, consolidating data via rollups and aggregation, and the like). Thus, the data model allows ad-hoc navigation throughout the data.

As described herein, while data is presented in an analytical setting, navigation to a user interface for performing transactional processing on presented data can be supported in an insight-to-action scenario, thereby taking advantage of the hybrid nature of the system.

Example 11—Example Search Processing

In any of the examples herein, another form of database processing can be supported by implementing a wide variety of search processing. A rich set of functionality allowing a user to search via a variety of search techniques and styles can be implemented by user interfaces. Customized and personalized search scenarios can be supported.

After desired data is found, the system can then easily transition to another database processing type (e.g., transactional or the like).

Example 12—Example Engine Types

In any of the examples herein, a database processing engine can take the form of any database processing engine directed to process a respective database processing archetype (e.g., transactional, analytical, search, or the like) to correlate with the described archetypes.

An engine itself need not be hybrid; rather the separate engines can be combined to form a hybrid system supporting hybrid scenarios.

In a cloud-based scenario, such engines can be configured to provide database processing as a service over a network. For example, transactional and analytical engines can be configured to provide online transaction processing as a service and online analytical processing as a service, respectively.

Because a rich set of services can be provided by an engine with plural software layers, the engine is sometimes referred to as a "stack."

Example 13—Example Shell

In any of the examples herein, a client-executable shell can host one or more executing applications local to the client that are configured to send database processing requests as described herein. As described herein, the shell can support a mix of applications from different archetypes in a way that users can navigate from an insight application to an action application (e.g., analytical archetype application or search archetype application to transactional archetype application). The shell can provide functionality for applications to share context, and cross-application user interface navigation can be supported.

In addition, home pages can be supported that represent a mix of archetypes. User interface services for navigation, personalization, single-sign-on, search, and others can be supported consistently across the different archetypes.

Such a shell can be configured to provide a rich set of functionality for application developers who wish to develop dynamic applications that can provide easy-to-use user interfaces, regardless of the large size of data sets being manipulated by the underlying requests.

User identify management can be provided by the shell so that navigation between hosted applications becomes a seamless user experience. For example, single-sign-on techniques can be applied to avoid multiple signins in a single session implementing a hybrid scenario.

A central place (e.g., dispatcher) to which the shell connects can be provided as described herein, such a central place can serve appropriate metadata and services. In some cases, separate connections can be supported.

Although such a shell can be implemented via HTML in a browser, platform-specific implementations can also be supported (e.g., a native app for a particular mobile operating system).

Example 14—Example Requests for Processing

In any of the examples herein, a request for processing can be a request for any of the kinds of database processing described herein, including online transaction processing, online analytical processing, search processing, or the like.

Responsive to receiving such a request for processing, the appropriate engine fulfills the request by performing the indicated processing and sending an appropriate response.

For example, the request may be a web request sent from a client-side shell or a client application program hosted within a client-side shell. As described herein, such requests can be generated by a user taking advantage of a rich Internet application interface.

Example 15—Example Dispatcher

In any of the examples herein, a request dispatcher can be used to receive requests and route the requests on to a destination. In a network configuration, a request dispatcher can be a server side component that acts as a single point of communication for clients that are external to the network. For instance, a request dispatcher can have an externally accessible endpoint that can receive requests from external clients and route the requests on to other servers on the network that are not externally accessible. In practice, a request dispatcher can be implemented as a reverse proxy, load balancer, or the like.

In a configuration where a client application is executed in a web browser and sends requests to server-side components from the web browser, a request dispatcher can be used to overcome the cross-origin request limitation of many modern web browsers. Alternatively, a technique such as Cross-Origin Resource Sharing (CORS) can be used to overcome various limitations. For example, separate communication points can be implemented for different database processing types.

In practice, the dispatcher can take the form of lightweight functionality that is eventually integrated into other components of the system, thus avoiding the overhead associated with a separate dispatcher.

Example 16—Example Request Routing

In any of the examples herein, it can be determined whether a request is for transactional processing or analytical processing. The request can then be directed to the appropriate engine based on the determination.

A determination of how to route a request can be implied based on the contents of the request or the request format. For instance, if the request is an HTTP request, the value of the universal resource locator (URL) can be used to indicate how the request should be routed and ultimately fulfilled. Alternatively, one or more of the request headers, or the one or more values in the request payload, may be considered when making the decision of how to route the request.

In some cases, such a determination can be implied. For example, such information can be engineered as to be included at development time of the application. The destination can be incorporated into the application so that sufficient information is included in a request to determine appropriate routing. For example, the database processing type can be implied by the URL or other information embedded in the request.

When requests are directed to a destination, they can first travel through one or more intermediaries as described herein. For example, a request can be directed to a destination by directing it to an intermediary (e.g., a dispatcher or the like) that then subsequently send it directly or indirectly to the destination.

For example, an ultimate destination can be incorporated into a URL for an HTTP request. The intermediary thus has sufficient information for knowing to where the request is to be directed. However, any other technique that results in appropriate routing of the request can be used.

Example 17—Example Advantages

The data used for online analytical processing is traditionally separated from that used in online transaction processing (e.g., into a data warehouse). In any of the example systems described herein, it is possible to support online analytical processing that draws from the same data sources as those used for online transaction processing. Advantages of such a system include more efficient data processing by eliminating redundant data stores. Advantages of such a system also include analytical processing that produces more up-to-date results. Because the analytical processing in such a system is performed on the most recent version of the data, and not a copy of the data (e.g., in a data warehouse), the results of analytical processing can reflect the current state of the data.

Such realtime reflection of the state of the database can prove invaluable because decisions can be made on current data, rather than old data.

Implementing a single system that accommodates hybrid database processing archetypes can provide such advantages and others, such as not requiring separate sign in by users, a single, coherent user experience resulting in fewer errors, more efficient task completion, reduced computing resource consumption, and overall improved usability.

Figure 3:
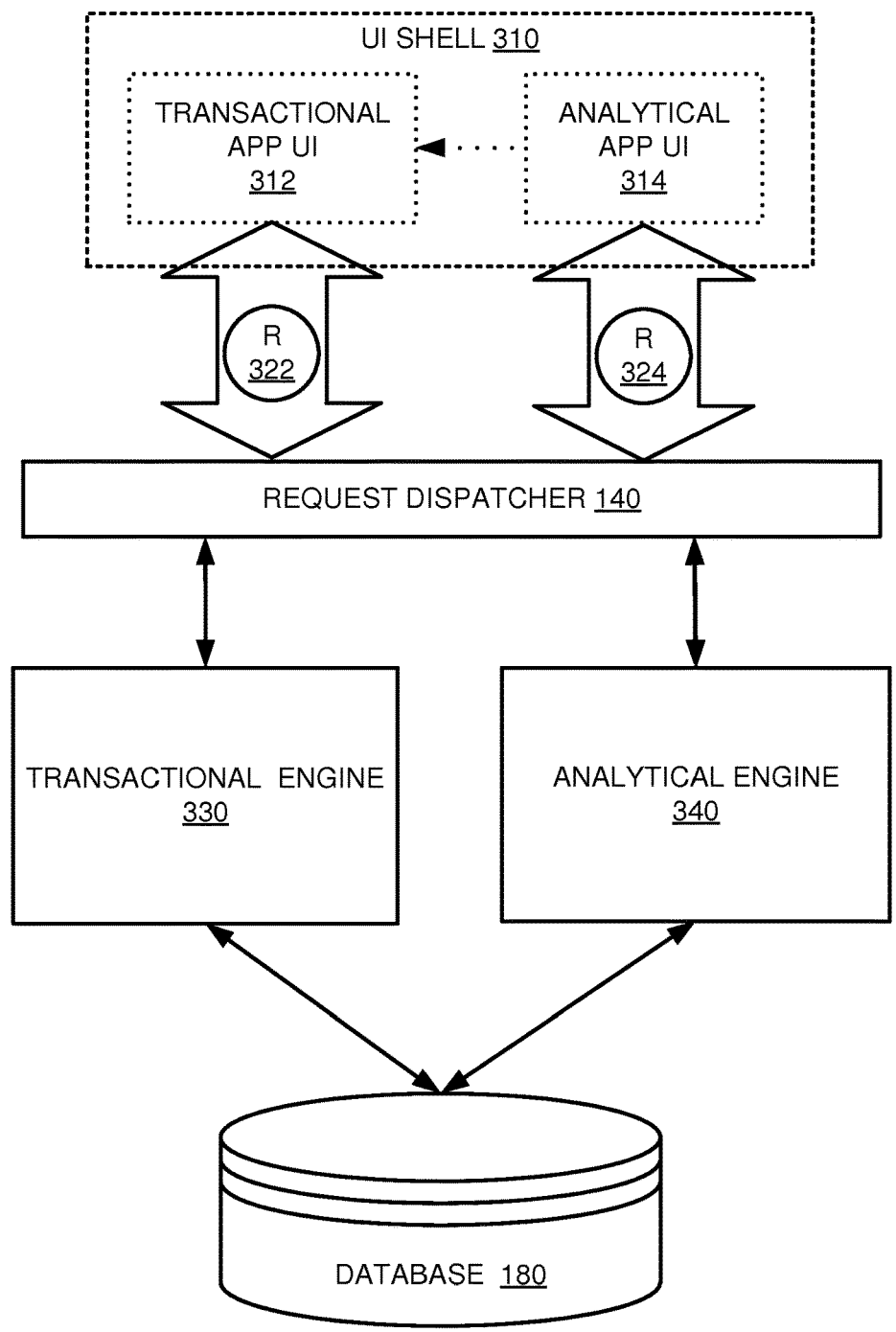
FIG. 3 is a block diagram of an example system implementing seamless navigation between client application programs of different client application archetypes.

Example 18—Example System Implementing Seamless Navigation Between Client Application Programs of Different Client Application Archetypes FIG. 3 is a block diagram of an example system 300 implementing seamless navigation between client application programs of different client application archetypes, as described herein. Such a system 300 can implement the described implementation as part of an insight-to-action scenario.

In the example, a client-executable shell 310 supports heterogeneous archetypes of client applications at a client device. The archetypes can comprise a client application program presenting a user interface 312 of a transactional archetype and a client application program presenting a user interface 314 of an analytical application archetype.

The transactional client application program presenting the user interface 312 is configured to direct requests 322 for online transaction processing to a transactional engine 330 via the request dispatcher 140, to receive responses to the requests 322 from the dispatcher 340, and to present the responses to the requests 322 on the user interface 312.

In the example, the analytical client application program user interface 314 is configured to direct requests 324 for online analytical processing to an analytical engine 340 via the request dispatcher 140, to receive responses to the requests 324 from the dispatcher 140, and to present the responses to the requests 324 on the user interface 314. For instance, a response to a request for online analytical processing 324 may contain one or more results of the requested analytical processing. The analytical client program application user interface 314 can then present one or more of the results to the user.

In the example, the client-executable shell 310 is configured to seamlessly navigate from the analytical client application program user interface 314 to the transactional client application program user interface 312. The transactional client application program user interface 312 can then be used to perform transactional processing on data (e.g., analysis results) that was presented by the analytical client application program user interface 314, including results of requested analytical processing. Other types of seamless navigation (e.g., between user interfaces implementing different archetypes) can be supported.

Figure 4:
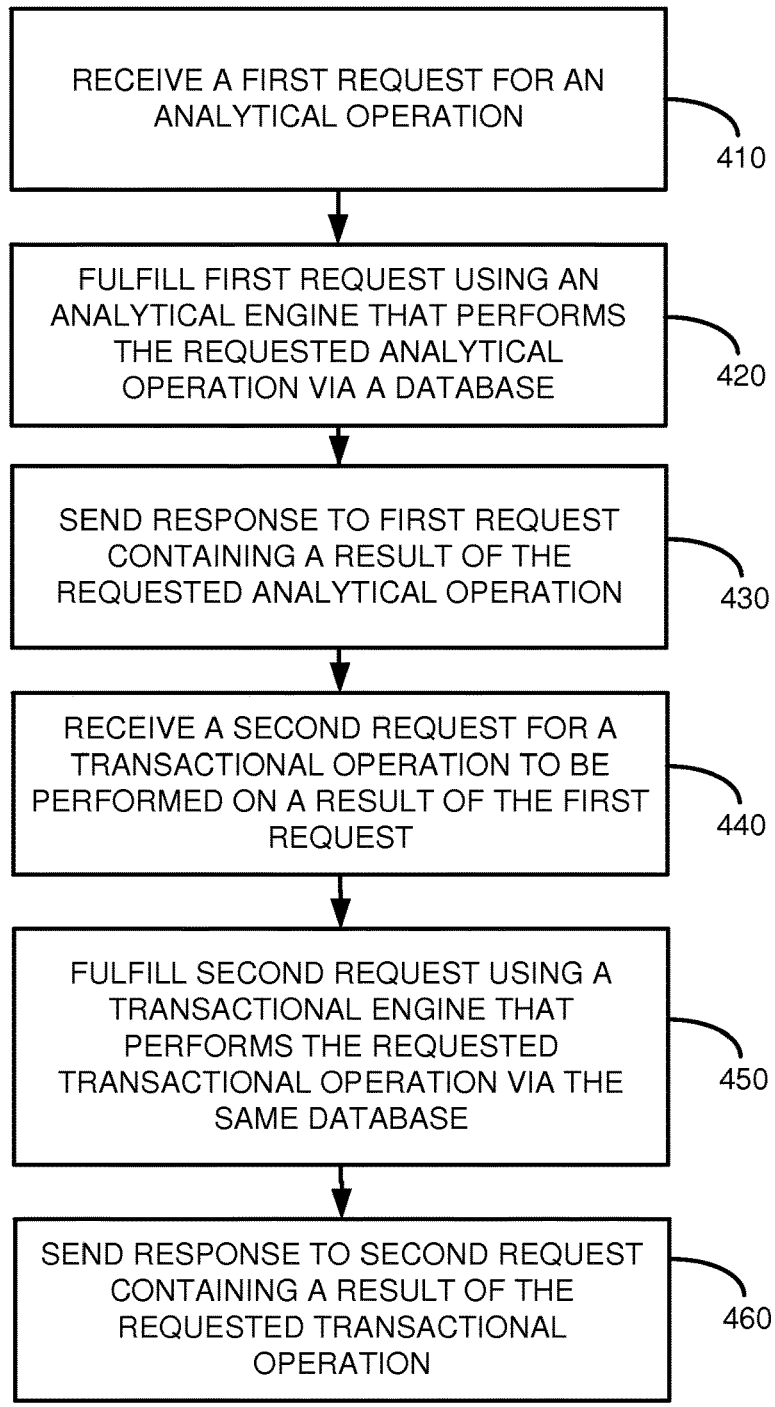
FIG. 4 is a flowchart of an example method implementing a seamless transition from analytical processing to transactional processing.

Example 19—Example Method Implementing Seamless Navigation Between Client Programs of Different Client Application Archetypes FIG. 4 is a flowchart of an example method 400 implementing a seamless transition from analytical processing to transactional processing and can be implemented, for example, in the system shown in FIG. 3 as an insight-to-action scenario.

At 410, a first request for online analytical processing is received. Such a request can be received as a result of interaction with a user interface providing online analytical processing options at a client device. A shell supporting heterogeneous archetypes can be implemented as described herein.

At 420, processing is performed to fulfill the request for online analytical processing. For example, the request may be fulfilled by an analytical engine that performs one or more analytical operations on a database based on the contents of the request.

At 430, a response is sent back to the requestor that sent the request for online analytical processing. For example, the response can contain one or more results of the analytical operations performed by the analytical engine. Such results can be displayed on the user interface at the client device.

At 440, a second request, this time for online transaction processing, is received. The second request can comprise a request for transactional processing on at least one of the one or more results of the analytical operations performed by the analytical engine that were sent as part of the response to the first request. Such a request can be received as a result of interaction with a user interface providing online transaction processing options at the client device.

At 450, processing is performed to fulfill the request for online transaction processing. For example, the request may be fulfilled by a transactional engine that performs one or more transactional operations on the database based on the contents of the second request.

At 460, a response is sent back to the requestor that sent the second request. For example, the response to the second request can contain one or more results of the transactional operations performed by the transactional engine. The results can then be displayed at the client device.

Instead of (or in addition to) analytical processing, a scenario implementing search processing can be implemented.

Figure 5:
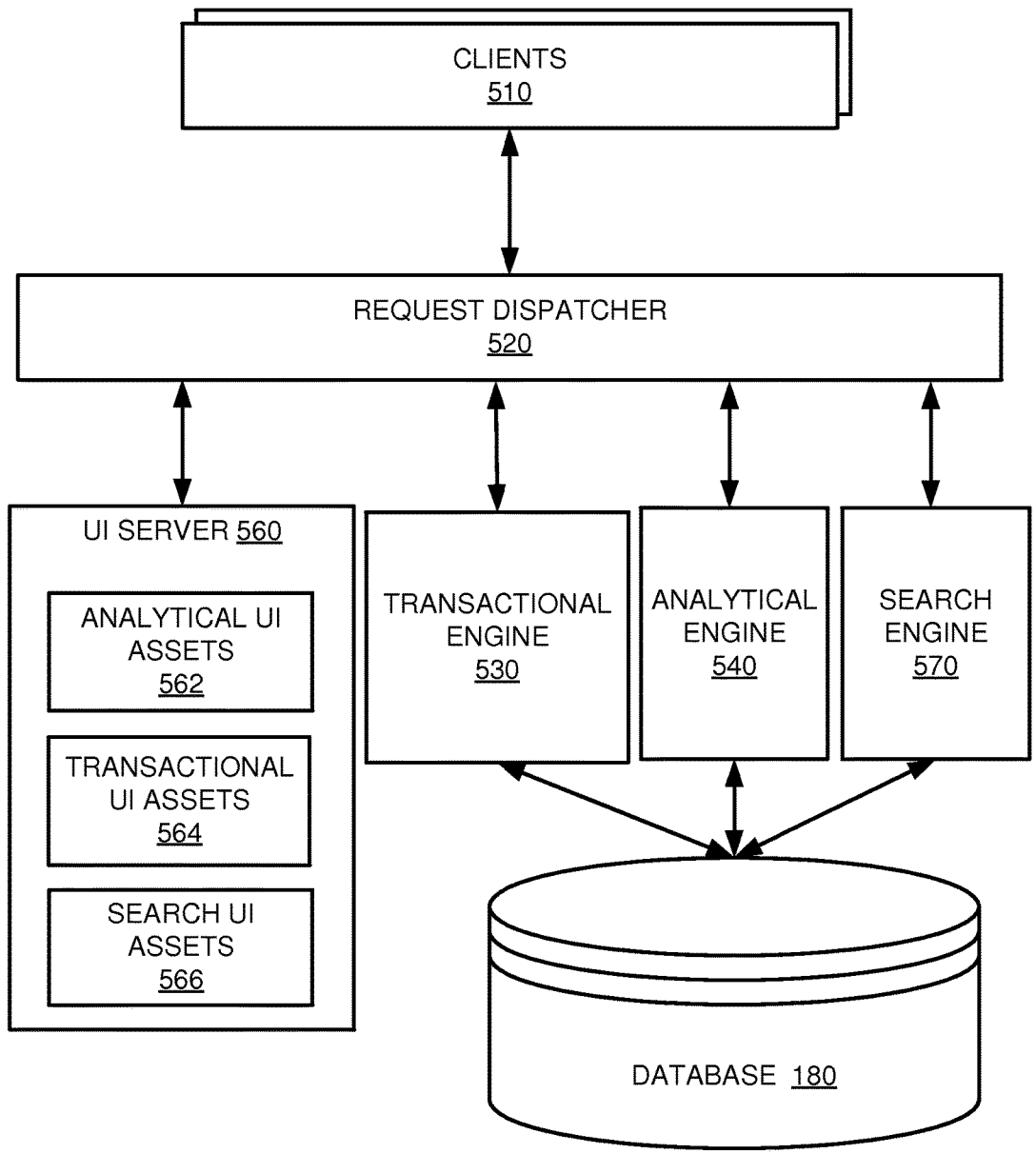
FIG. 5 is a block diagram of an example system implementing a server that hosts user interface assets for client application programs of different client application archetypes.

Example 20—Example System Providing User Interface Assets for Client Application Programs of Different Client Application Archetypes FIG. 5 is a block diagram of an example system 500 implementing a server that hosts user interface assets for client application programs of different client application archetypes, as described herein.

In the example, one or more clients 510 support heterogeneous archetypes of client application programs. In practice, each client 510 can be a client-executable shell 110 that can host one or more client application programs that conform to the client application archetypes. Although other types of clients can also be supported.

A client 510 is configured to direct requests for client application user interface assets to a server-side user interface server 560. The user interface server 560 is configured to store user interface assets for heterogeneous client application archetypes. In the example, the user interface server 560 can store analytical client application user interface assets 562 and transactional client application user interface assets 564. The user interface server 560 can store other types of user interface assets (e.g., search user interface assets 566 and the like). In practice, the user interface server 560 can provide a shared infrastructure that serves user interface assets of different types to client application programs of different archetypes. For example, some the assets themselves and/or functionality for providing such assets can be shared.

In the example, the user interface server 560 is configured to receive requests for client application user interface assets and to fulfill the requests by sending one or more client application user interface assets stored on the user interface server 560 in response.

In the example, one or more of the client application user interface assets stored on the user interface server 560 can enable a client 510 to send one or more requests for online processing. For instance, a transactional client application user interface asset 564 can enable a client 510 to send one or more requests for online transaction processing that can be fulfilled by transactional engine 530 using the database 180. Similarly, an analytical client application user interface asset 562 can enable a client 510 to send one or more requests for online analytical processing that can be fulfilled by analytical engine 540 using database 180. Similarly, a search client application user interface asset 566 can enable a client 510 to send one or more requests for search processing that can be fulfilled by search engine 570 using the database 180.

In the example, requests are directed to an intermediary request dispatcher 520. The request dispatcher 520 is configured to receive incoming requests, direct requests for online transaction processing to server-side transactional engine 530, direct requests for online analytical processing to server-side analytical engine 540, direct requests for online search processing to server-side search engine 570, and direct requests for client application user interface assets to user interface server 560. As described herein, a variety of mechanisms can be employed for directing requests to the appropriate destination.

A method for processing the requests can be similar to that shown in FIG. 2. Additionally, the described user interface assets and other database processing requests can be accommodated.

Because user interface assets and/or infrastructure can be shared between or among database processing archetypes, the overall computing resources required to implement hybrid scenarios is reduced.

Example 21—Example User Interface Assets

In any of the examples herein, user interface assets can take a wide variety of resources for presenting user interfaces at client devices. As described herein, a user interface server can provide such assets (e.g., to a requesting client). The user interface server thus serves as a server for providing a frontend of an application, so it is also sometimes called a "frontend server." A user interface server can also store client application programs and provide the client application programs in response to requests from client-executable shells.

A rich set of user interface functionality can be supported. For instance, a wide variety of client devices with differing functionality, capabilities, and screen real estate can be supported. Thus, in practice, a complex set of assets can be used to represent a single user interface element as rendered in a particular instance of implementation of the user interface on a particular client device.

The user interface assets can include user interface assets for presenting user interface elements for navigating from an analytical database processing scenario to a transactional database processing scenario in an insight-to-action implementation.

Example 22—Example Method of Implementing a Hybrid Client Application

Figure 6:
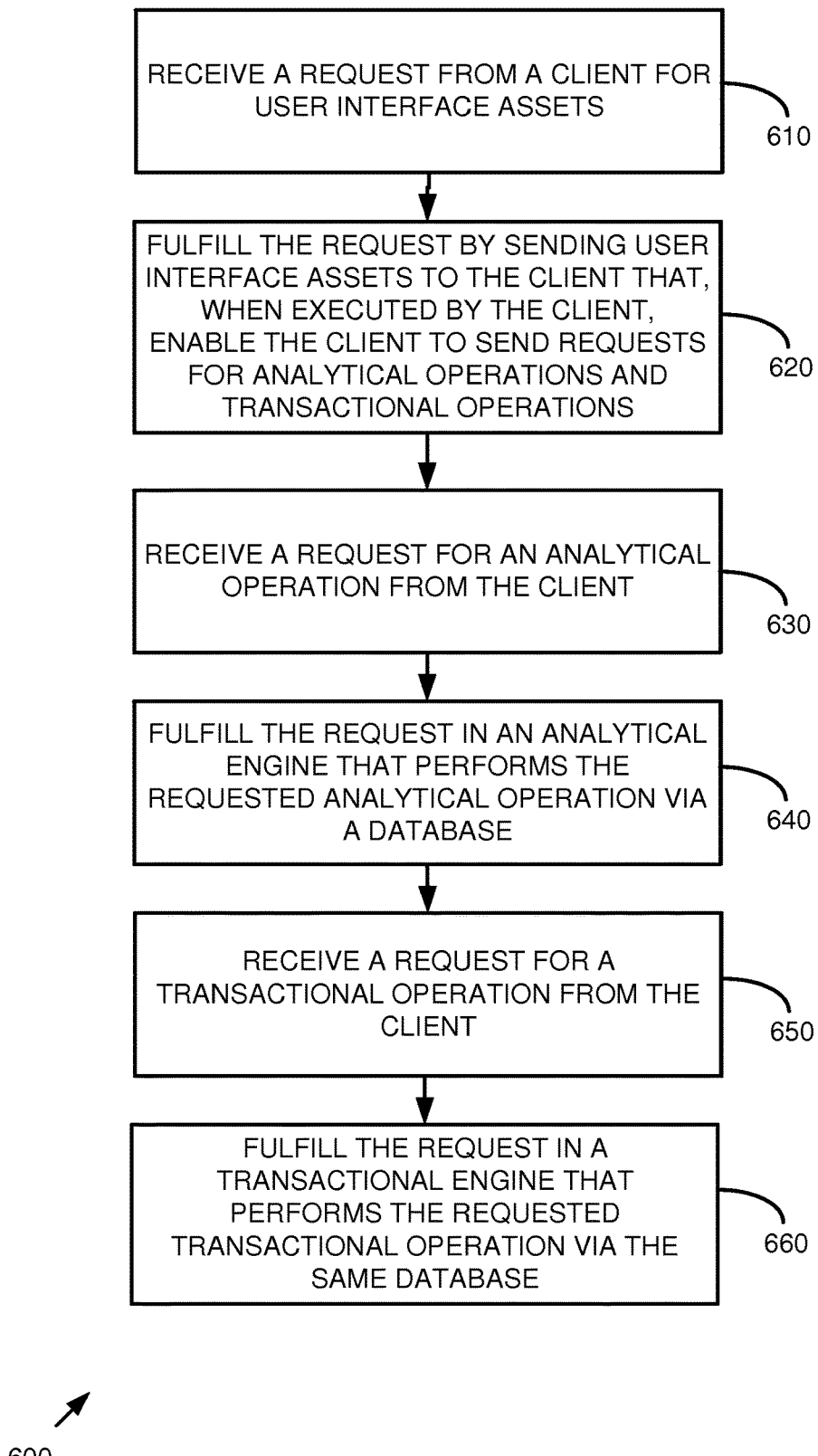
FIG. 6 is a flowchart of an example method of implementing a hybrid client application.

FIG. 6 is a flowchart of an example method 600 of implementing a hybrid client application and can be implemented, for example, in the system shown in FIG. 5.

At 610, a request for one or more client application user interface assets is received. The request can be received from a client-side shell supporting heterogeneous archetypes of client application programs comprising a transactional application archetype and an analytical application archetype. As described herein, additional archetypes can be supported. Although the request is described as being "from a client-side shell," the request can originate from within a client-side application program hosted by the client-side shell.

At 620, the request is fulfilled by sending one or more client application user interface assets in response. In the example, one or more of the client application user interface assets sent as part of the response can enable the client-side shell to send one or more requests for analytical processing and transactional processing. Although the client application user interface assets can enable the client-side shell to send requests for other types on processing as well.

At 630, a request for online analytical processing is received.

At 640, processing is performed to fulfill the request for online analytical processing. For example, the request may be fulfilled by an analytical engine that performs one or more analytical operations on a database based on the contents of the request.

At 650, a request for online transaction processing is received.

At 660, processing is performed to fulfill the request for online transaction processing. For example, the request may be fulfilled by a transactional engine that performs one or more transactional operations on the database based on the contents of the request.

Figure 7:
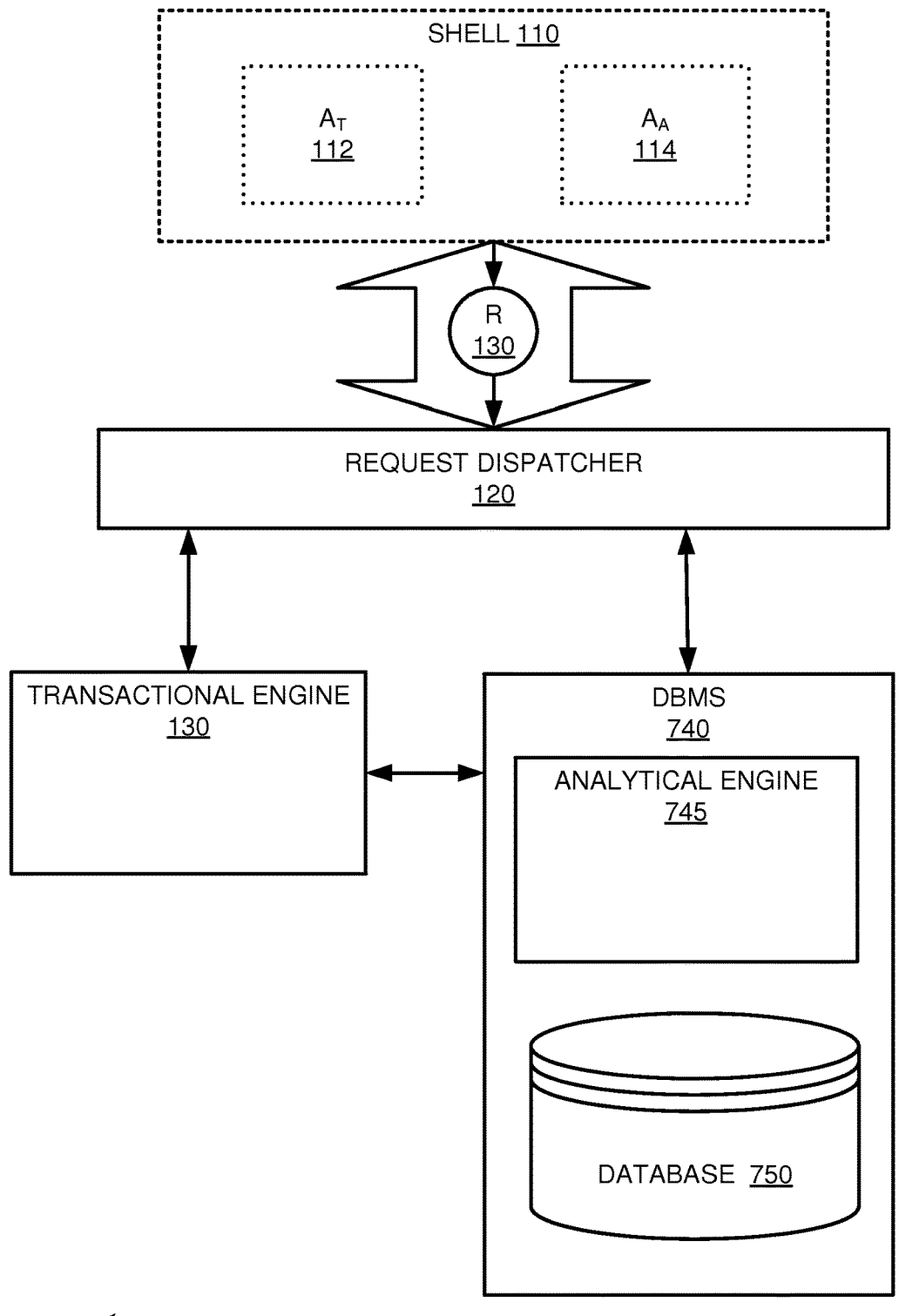
FIG. 7 is a block diagram of an example system implementing heterogeneous client application archetypes, wherein an analytical engine and database are hosted by a database management system.

Example 23—Example System Hosting an Analytical Engine and Database in a Database Management System FIG. 7 is a block diagram of an example system 700 implementing heterogeneous client application archetypes, as described herein.

In the example, analytical engine 745 and database 750 are hosted by database management system (DBMS) 740. The DBMS 740 is configured to route requests for online analytical processing to analytical engine 745. The DBMS can also be configured to broker interaction with database 750. For instance, transactional engine 130 can direct requests for transactional database operations to DBMS 740, even if transactional engine 130 cannot directly access database 750. DBMS 740 can then direct the requests for transactional operations to database 750. DBMS 740 can also broker requests for other types of database operations, such as analytical database operations. In practice, DBMS 740 can also perform database management tasks, such as evaluating requests for database operations, enabling transactions independent of database 750, ensuring atomicity, isolation, consistency, and durability of operations, etc.

Example 24—Further Example Embodiments

The following describes further embodiments implementing the technologies described herein. In the examples, applications of different archetypes are hosted by a shell implementing Fiori technologies, and the underlying database implements HANA technologies, both of SAP SE. However, other implementations are possible without departing from the technologies described herein.

An implementation can implement a transaction archetype via applications that run best on an in-memory, columnar database, but can also be ported to other database systems. Such scenarios are typically transactional and represent views on and interaction with existing business processes and solutions. Requests can be fulfilled via a stack optimized for transactions.

An analytical archetype can be implemented via purely analytical applications that run exclusively on an in-memory, columnar database following a live (e.g., two-tier) architecture using virtual data models. Such an archetype can include key performance indicator dashboards and cockpits. Other analytical, predictive, and planning applications can be supported. Such applications are typically not ported to other database systems. Requests can be fulfilled via an extended services stack optimized for analytics.

A search archetype can be implemented via search applications that run on an in-memory, columnar database but also run through a stack of a database language optimized for transactions (e.g., ABAP or the like), but can eventually be ported to a two-tier structure. Navigation of business objects can be supported. Factsheets and enterprise search models can be supported.

Figure 8:
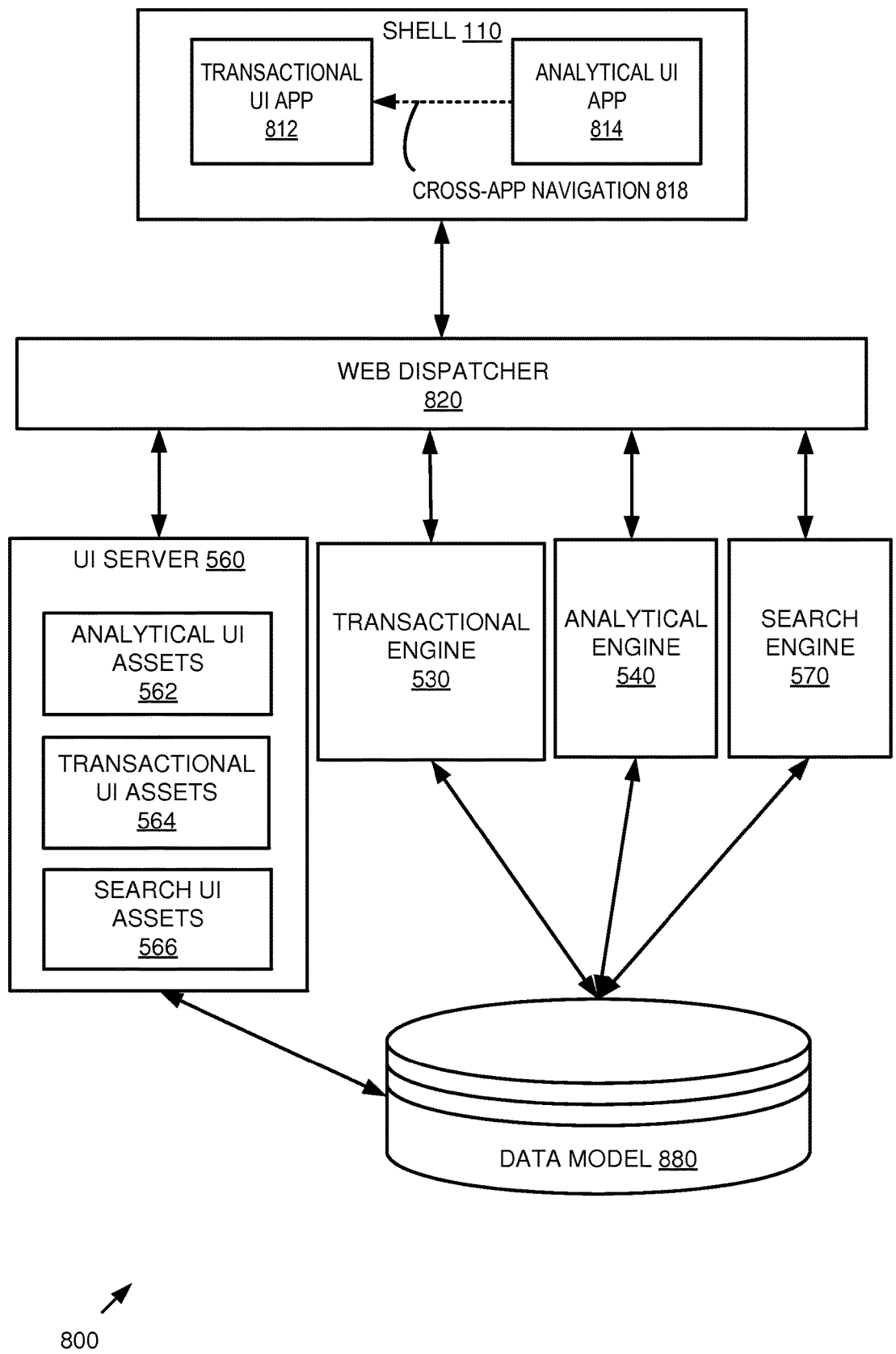
FIG. 8 is a block diagram of another example system implementing heterogeneous client application archetypes, wherein a user interface server and engines share a data model in an insight-to-action scenario.

Example 25—Another Example System Hosting an Analytical Engine and Database in a Database Management System FIG. 8 is a block diagram of another example system 800 implementing heterogeneous client application archetypes, wherein a user interface server 560 and engines 530, 540, 570 share a data model in an insight-to-action scenario. The example system 800 can use components from the system of FIG. 5.

The shell 110 can host both a transactional UI application 812 and an analytical UI application 814 and support cross-app navigation 818 as described herein in an insight-to-action scenario. A web dispatcher 820 can field requests from the shell 110 (e.g., made on behalf of the apps 812, 814) and direct requests to the UI server 560, or an appropriate engine 530, 540, 570. The engines 530, 540, 570 can be implemented in a common framework that supports both analytical operations (e.g., to support drilldown, views, stored procedures, and the like) and transactional operations.

In the example, the engines 530, 540, 570 and the UI server 560 share a data model 880. Infrastructure that is described as shared between archetypes can be shared between the UI server 560 and the engines 530, 540, 570.

In the examples, various implementation details are described, but alternatives can easily be substituted as desired.

Example 26—Example Business Object Model

In any of the example herein, various components of the system can operate according to a single business object model when performing processing related to business objects. For example, the online transaction processing services runtime (e.g., and the business object business logic within it) and the online analytical processing services runtime can use a single model when processing business objects. Additional layers (e.g., a data access layer interposed between a business logic layer and the database to send and receive data) can also adhere to the model.

A single business object model can be implemented by using a single data model throughout the processing stack (e.g., including in the single persistence in the database). For example, a single data format model can be used for business object attributes. In addition, representations of business objects can be split into business logic and metadata as described herein. Various components of the system can access the logic, metadata, or both as needed to fulfill requests for services.

As described herein, the business object model can adhere to a one-to-one relationship between business object nodes and database tables.

Although some of the possible advantages apply at runtime, a single business object model can also provide possible advantages during development. For example, a single programming model can be used when implementing business objects, leading to faster development time, less configuration, and easier modification of the system. Such advantages can be particularly helpful in a software-as-a-service (SaaS) or cloud computing scenario because configuration can be achieved via a rich Internet application rather than conventional coding techniques.

Example 27—Example Single Data Format Model

In any of the examples herein, the business object model can comprise a single data format model that can be implemented in any of the components described. For example, a single, common (e.g., shared) attribute name and a single, common (e.g., shared) attribute data type can be used when referring to a business object attribute throughout the processing stack, from the online transaction services runtime, associated business logic, the online analytical processing services runtime, and in the single persistence in the database. So, instead of having a special, separate name or format for OLAP services, the OLTP name or format can be used (or vice versa).

Such an arrangement can lead to significant advantages, such as the ability to bypass the business logic at runtime when fulfilling requests for online analytical processing services. By going direct to the database (e.g., via views on the database), performance can be improved.

Example 28—Example Computing Systems

Figure 9:
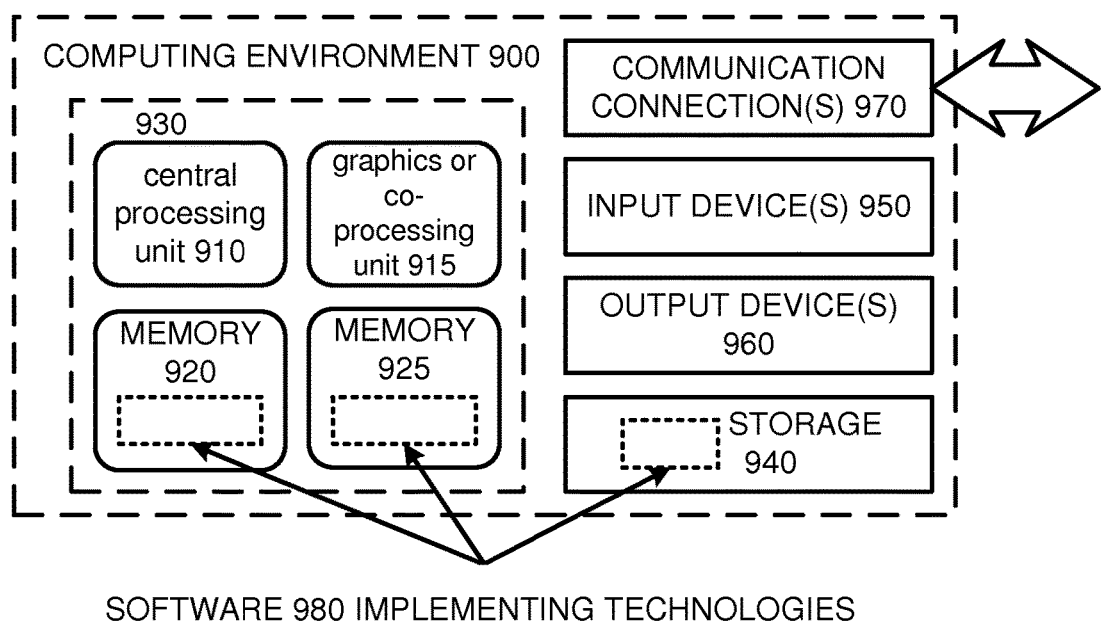
FIG. 9 is a diagram of an example computing system in which described embodiments can be implemented.

FIG. 9 illustrates a generalized example of a suitable computing system 900 in which several of the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 29—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computer, the method comprising:
   receiving a processing request, at a request dispatcher, from a client-side shell supporting heterogeneous archetypes of client application programs comprising a transactional application archetype and an analytical application archetype;
   based on whether the processing request is for transactional processing or analytical processing, choosing between directing the processing request to a transactional engine configured to perform at least one transactional operation on a database, and directing the processing request to an analytical engine configured to perform at least one analytical operation on the same database, wherein the transactional engine comprises a first service executing on a first server and the analytical engine comprises a second service executing on a second server, wherein directing the processing request to the transactional engine comprises sending the processing request from the request dispatcher to the first service executing on the first server over a computer network, and directing the processing request to the analytical engine comprises sending the processing request from the from the request dispatcher to the second service executing on the second server over the computer network;
   receiving requests for a plurality of user interface assets from the client-side shell at the request dispatcher, wherein the plurality of assets comprise a user interface asset for transactional processing and another user interface asset for analytical processing;
   retrieving the plurality of user interface assets from a user interface server storing user interface assets shared between transactional application archetype client applications and analytical application archetype client applications, wherein the retrieved plurality of user interface assets enable the client-side shell to send requests, including the processing request, for transactional processing and analytical processing; and
   sending the user interface asset to the client-side shell.

2. The method of claim 1, further comprising:
   in response to the processing request, sending a result of the at least one transactional operation back to the client-side shell or sending a result of the at least one analytical operation back to the client-side shell.

3. The method of claim 1 wherein:
   the processing request is for analytical processing; and
   a result of the at least one analytical operation is presented by a client application program of the analytical application archetype; and
   the method further comprises:
   receiving a second processing request from a client application program of the transactional application archetype after seamlessly transitioning from a user interface of the client application program of the analytical application archetype to a user interface of the client application program of the transactional application archetype, wherein the second processing request comprises transactional processing on a result of the at least one analytical operation.

4. The method of claim 1 wherein:
   the client-side shell further supports a search application archetype;
   the method further comprises:
   receiving a second processing request from a client program hosted by the client-side shell for search processing; and
   directing the second processing request to a search engine configured to perform at least one search operation via the database.

5. A system comprising:
   a client computing device comprising one or more processors and one or more computer-readable non-transitory media comprising a client-executable shell supporting heterogeneous archetypes of client application programs comprising a transactional application archetype and an analytical application archetype that, when executed by the one or more processors, cause the client computing device to:
   send processing requests for online transaction processing to a server-side transactional engine service running on a first server, wherein the server-side transactional engine is configured to perform online transaction processing on a database,
   send processing requests for online analytical processing to a separate server-side analytical engine service running on a second server, wherein the server-side analytical engine is configured to perform online analytical processing on the same database,
   send requests for user interface assets to a separate frontend server,
   receive the user interface assets from the separate frontend server, and use the user interface assets to send the processing requests for online transaction processing and to send the processing requests for online analytical processing; and the frontend server, comprising a plurality of user interface assets, wherein the user interface assets comprise user interface assets for online transaction processing user interfaces presented in the client-executable shell and user interface assets for online analytical processing user interfaces presented in the client-executable shell.

6. The system of claim 5 wherein the frontend server is configured to provide both the user interface assets for online transaction processing user interfaces and the user interface assets for online analytical processing user interfaces using a shared infrastructure.

7. The system of claim 5 wherein:
a given processing request is routed between the server-side transactional engine or the server-side analytical engine via an indication in the given processing request.

8. The system of claim 5 wherein:
the client-executable shell directs requests across heterogeneous archetypes to a same entry point.

9. The system of claim 5 further comprising:
a content server storing the client application programs configured to provide the client application programs upon request of the client-executable shell.

10. The system of claim 5 further comprising:
a client application program of the transactional application archetype; and
a client application program of the analytical application archetype;
wherein the client-executable shell supports seamless navigation from a user interface of the client application program of the transactional application archetype to a user interface of the client application program of the analytical application archetype to perform transaction processing on data shown in an analytical setting.

11. The system of claim 10 wherein:
the client application program of the transactional application archetype and the client application program of the analytical application archetype are integrated into a single, hybrid client application.

12. The system of claim 5 further comprising:
the server-side transactional engine supporting online transaction processing on the database and configured to provide online transaction processing as a service; and
the server-side analytical engine supporting online analytical processing on the same database and configured to provide online analytical processing as a service.

13. The system of claim 5 wherein:
the client-executable shell supports consistent navigation and personalization across the heterogeneous archetypes.

14. The system of claim 5 further comprising:
a dispatcher configured to accept incoming requests comprising the requests for online transaction processing and the requests for online analytical processing, and further configured to selectively direct the incoming processing requests between the server-side transactional engine and the server-side analytical engine.

15. The system of claim 14 wherein:
the incoming processing requests are directed based on a uniform resource locator contained therein.

16. One or more non-transitory computer-readable media comprising computer-executable instructions causing a computing system to perform a method comprising:
receiving requests for a plurality of user interface assets from a client application, wherein the plurality of assets comprise a user interface asset for transactional processing and another user interface asset for analytical processing;

fulfilling the requests by retrieving the plurality user interface assets from a user interface server storing user interface assets shared between transactional application archetype client applications and analytical application archetype client applications, wherein the retrieved plurality of user interface assets enable the client application to send processing requests for transactional processing and analytical processing to the computing system;

sending the plurality of user interface assets to the client application;

receiving a first processing request from the user interface asset for analytical processing at the client application, the first processing request being for performance of one or more analytical operations;

fulfilling the first processing request by using an analytical engine executing on a first processing server to process the first processing request, the analytical engine performing the one or more analytical operations via a single persistence in a database;

sending a first processing response to the client application, the first processing response comprising one or more results of the one or more analytical operations;

receiving a second processing request from the user interface asset for transactional processing at the client application, the second processing request being for performance of a transactional operation, wherein the transactional operation is performed on at least one of the one or more results of the one or more analytical operations;

fulfilling the second request by using a transactional engine executing on a second processing server to process the second processing request, the transactional engine performing the transactional operation via a same single persistence in the database; and sending a second processing response, the second processing response comprising at least one result of the transactional operation;

whereby a single system supports a plurality of different database processing archetypes.

* * * * *